(12) United States Patent
Jackson

(10) Patent No.: US 9,303,560 B2
(45) Date of Patent: Apr. 5, 2016

(54) SCREW SHAFT TURBINE COMPRESSOR AND SYSTEM

(71) Applicant: John R. Jackson, Littleton, CO (US)

(72) Inventor: John R. Jackson, Littleton, CO (US)

( * ) Notice: Subject to any disclaimer, the term of this patent is extended or adjusted under 35 U.S.C. 154(b) by 66 days.

(21) Appl. No.: 14/177,668

(22) Filed: Feb. 11, 2014

(65) Prior Publication Data

US 2014/0157751 A1  Jun. 12, 2014

Related U.S. Application Data

(63) Continuation-in-part of application No. 12/876,836, filed on Sep. 7, 2010, now Pat. No. 8,689,535, which is a continuation-in-part of application No. 11/774,418, filed on Jul. 6, 2007, now Pat. No. 7,788,896.

(51) Int. Cl.

| | | |
|---|---|---|
| *F02C 3/073* | (2006.01) | |
| *F01D 1/38* | (2006.01) | |
| *F01D 5/02* | (2006.01) | |
| *F01D 5/06* | (2006.01) | |
| *F01D 5/08* | (2006.01) | |
| *F02C 3/045* | (2006.01) | |
| *F02C 7/266* | (2006.01) | |

(52) U.S. Cl.
CPC . *F02C 3/073* (2013.01); *F01D 1/38* (2013.01); *F01D 5/023* (2013.01); *F01D 5/066* (2013.01); *F01D 5/085* (2013.01); *F02C 3/045* (2013.01); *F02C 7/266* (2013.01); *Y02T 50/672* (2013.01); *Y02T 50/676* (2013.01)

(58) Field of Classification Search
CPC .......... F02C 3/073; F02C 3/045; F02C 7/266; F01D 1/38; F01D 5/023; F01D 5/066; F01D 5/085; Y02T 50/672; Y02T 50/676
See application file for complete search history.

(56) References Cited

U.S. PATENT DOCUMENTS

| | | | |
|---|---|---|---|
| 2,645,412 A | 7/1953 | Sens | |
| 2,808,813 A | 10/1957 | Teodor et al. | |
| 3,310,043 A | 3/1967 | Gamage | |
| 3,386,245 A | 6/1968 | Gamage | |
| 3,609,058 A | 9/1971 | Tarsoly | |
| 3,932,988 A * | 1/1976 | Beaufrere | 60/737 |
| 6,367,247 B1 * | 4/2002 | Yancey | 60/412 |
| 6,517,544 B1 * | 2/2003 | Michelson | 606/80 |
| 7,788,896 B2 * | 9/2010 | Jackson | 60/39.45 |
| 8,689,535 B2 * | 4/2014 | Jackson | 60/39.45 |
| 2002/0131860 A1 * | 9/2002 | Takei | 415/55.4 |
| 2003/0035718 A1 * | 2/2003 | Langston et al. | 415/123 |
| 2003/0223860 A1 * | 12/2003 | Cerruti | 415/90 |
| 2006/0101805 A1 * | 5/2006 | Greco | 60/226.2 |

OTHER PUBLICATIONS

Office Action Re U.S. Appl. No. 11/774,418 dated Dec. 4, 2009.

* cited by examiner

*Primary Examiner* — Ehud Gartenberg
*Assistant Examiner* — Karthik Subramanian
(74) *Attorney, Agent, or Firm* — Leyendecker & Lemire, LLC

(57) ABSTRACT

Disclosed herein are screw shaft turbine compressors having (i) a compressor section, (ii) a turbine section, (iii) a combustion section coupling to the compressor section and the turbine section, and (iv) a grooved shaft. The grooved shaft can include one or more grooves for providing fuel from the compressor section to the combustion section and for allowing exhaust to leave the combustion section and exit the turbine section. A method for generating different speed to torque ratios on the shaft and a system for generating torque on the shaft are further disclosed.

19 Claims, 10 Drawing Sheets

SCREW SHAFT TURBINE COMPRESSOR AND SYSTEM

CROSS-REFERENCE TO RELATED APPLICATIONS

This application is a continuation-in-part of and claims priority to U.S. application Ser. No. 12/876,836, filed Sep. 7, 2010, which is a continuation-in-part of U.S. Pat. No. 7,788, 896, issued Sep. 7, 2010, the full disclosure of both which are incorporated herein by reference.

FIELD OF THE INVENTION

This invention generally relates to compressor turbines.

BACKGROUND OF THE INVENTION

Compressor turbines are combustion rotary engines. Although combustion turbine engines come in various designs, each engine is defined by a compressor section adapted to increase the pressure on the air or air-fuel mixture, a combustion chamber which ignites the compressed mixture, and a coupled turbine portion. The energy released from the combustion chamber spins the turbine portion, which, in turn, powers and rotates the compressor section.

Turbine-compressor combustion engines were first patented in England in the late $18^{th}$ century. However, it wasn't until the $20^{th}$ century that turbines were developed which could be used to operate useful machinery. Particularly, axial-flow turbine compressors, where compressed fluid or gas flows generally parallel an axis of rotation, began to be developed and used in the aircraft industry during the 1940's. By the 1950's every major aircraft engine developer had moved to an axial-flow engine type.

Modern-day compressor turbines incorporate the use of blades to rotate and compress the fluid or gas. A typical axial compressor has a shaft which looks like a fan with blades, likely contoured, which are followed by a set of stationary blades, also known as stators. The blades may help increase efficiency of compressor designs. Additionally, axial compressors have a general conical shape, widest at the inlet, to compress the fluid or gas towards the combustion chamber.

The problem with many current turbine-compressor engines is that they are unreliable. Complex blade orientation design create increased breakdown opportunities, especially when the engines run at high output rates. Many of these maintenance problems cause safety hazards, either during repair or upon failure. Additionally, the fuel efficiency of many of these turbine engines, even with the use of fans, is uneconomical for many applications.

DETAILED DESCRIPTION

Figure 1:
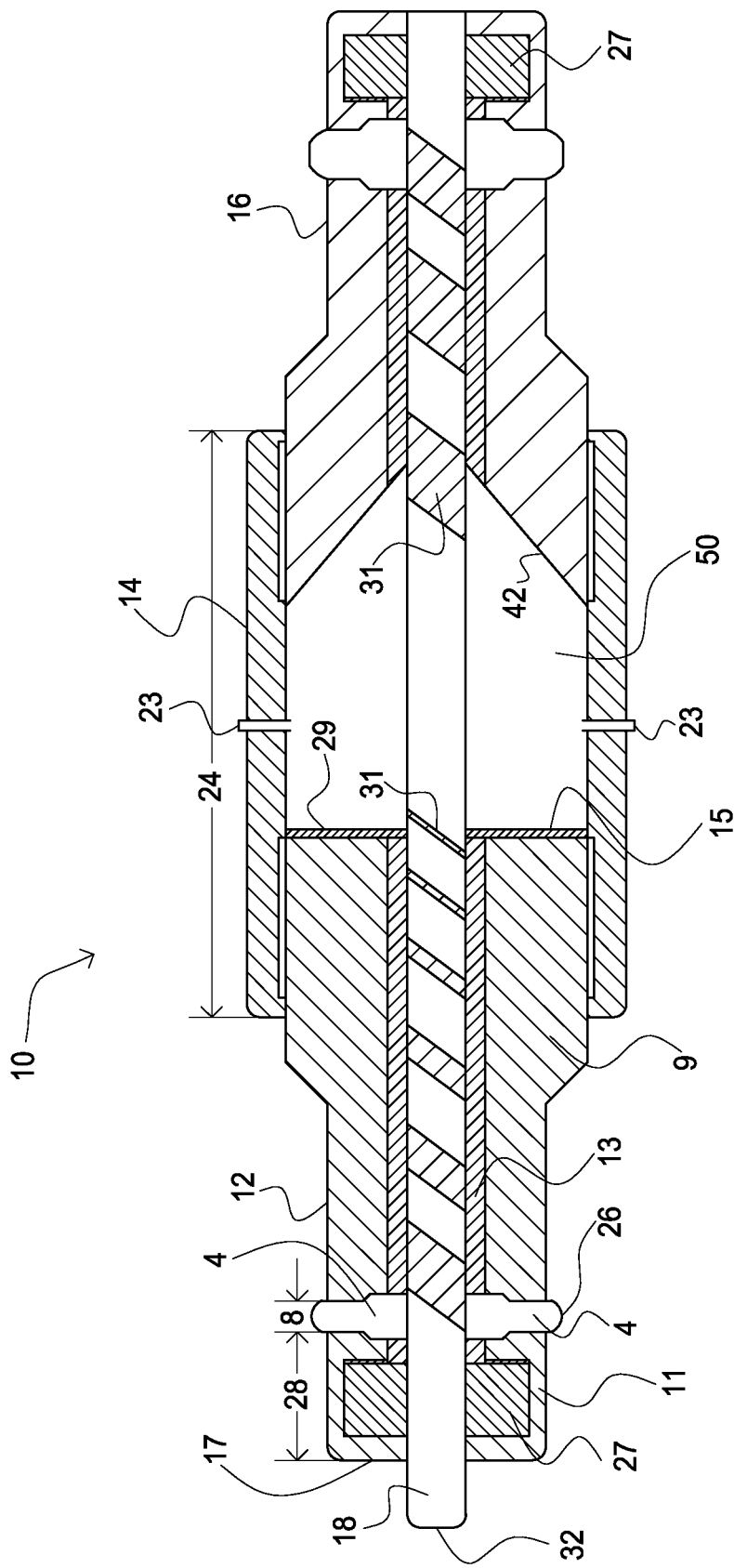
FIG. 1 is a side cut-away view of a screw shaft turbine compressor according to a first embodiment of the present invention.

Embodiments of a screw shaft turbine compressor offer potentially greater reliability than prior art turbine compressors as the embodiments do not incorporate the use of blades to compress and direct fluid flow. Instead, embodiments rely on a grooved shaft to direct and compress fluid flow. In addition to the grooved shaft, embodiments are typically comprised of three sections: a compressor section, a combustion section, and a turbine section. However, a version is also contemplated that includes blades, also known as fins.

The combustion section can be a hollow cylinder having at least one ignition device. The combustion section material typically has high yield strength such as, but not limited to, hardened steel or a steel alloy. One end of the combustion section is adapted to couple to the compressor section and one end is adapted to couple to the turbine section. Embodiments can employ threaded sections to enable coupling, however, other coupling methods may be employed. The ignition device can be a spark plug and various composite materials may also be used as applicable.

Coupled to a first end of the combustion section of several embodiments is the compressor section. In some embodiments where the inner surface of a cylindrical combustion cylinder is threaded, the compressor section is also cylindrically-shaped and has threads on the outer surface of a portion of a distal end of the section. The compressor section outer surface threads are substantially adapted to mate with the combustion section inner surface threads. Also in an embodiment, the diameter of the compressor section distal end can be larger than the diameter of a compressor section proximal end.

The compressor section also includes a bore whose longitudinal axis is typically substantially parallel with the longitudinal axis of the compressor section. The center of the bore can be substantially aligned with the center of the outer surface of the distal end and the outer surface of the proximal end of the compressor section. The outer surface of each end is typically generally parallel to each other and perpendicular the compressor section's longitudinal axis. Encircling the bore can be a bushing comprised of ceramic or hardened steel. Included in the compressor section are one or more input or inlet ports. The one or more inlet ports are adapted to receive a substance such as, but not limited to, fuel, air, or a fuel-air mixture, and introduce the substance to the bore.

In embodiments, the turbine section can be generally a mirror-image of the compressor section. For example, the proximal end of the turbine section can be coupled to the combustion section through threads substantially similar to the compressor section's distal end threads. Additionally, the turbine section proximal end can have a diameter greater than the distal end. The turbine section bore can also substantially similar to the compressor section bore.

A difference between the compressor section and the turbine section is that one turbine section proximal end outer surface is generally not parallel to the turbine section distal end outer surface—nor is the proximal end outer surface generally perpendicular to the longitudinal axis of a turbine section bore. Although the distal end outer surface is generally parallel to the longitudinal axis of the turbine section, the proximal end outer surface is angled towards the distal end, ending in the bore generally located in the center of the surface. Therefore, the proximal end of the turbine section is generally conically-shaped or concave-shaped with the bore located at the cone apex. Another difference between the turbine section and the compressor section is that the turbine section has one or more exhaust ports instead of one or more inlet ports. The exhaust ports can be adapted to allow exhaust to be released from the bore.

The shaft is typically placed in through the compressor section, coupled combustion section, and turbine section bores. In addition to the bushing-lined bores, the shaft can be supported in with bearings. At least one bearing may be located within the compressor section and at least one bearing may be located in the turbine section. The shaft typically has at least one spiraled or helically-shaped groove on its surface. A first groove in a first embodiment spirals from a location proximal the compressor section intake port and ends at a location proximal the edge of the compressor section's distal end.

However, a similar first groove in a second embodiment can be a generally straight groove from a location proximal the compressor section inlet port and ends at a location proximal the edge of the compressor section's distal end. In some embodiments, the groove width is adapted to decrease as the distance towards the compressor section distal end decreases. A second groove typically comprises a spiraled or helical groove and generally extends from the combustion chamber to the one or more exhaust port in the turbine section. An exemplary embodiment of a system for generating torque on a shaft using embodiments of the screw shaft turbine compressor is also described herein.

In one embodiment, the screw shaft turbine compressor can include a shaft having a widened portion proximate the turbine section. The widened portion of the shaft can include one or more grooves. For instance, the one or more grooves can be spiraled or helical grooves. The compressor section can include a bushing having one or more grooves and the combustion section can include a bushing having a concave cylindrical shape. Further, the screw shaft turbine compressor can include intake ports and exhaust ports parallelly aligned with a longitudinal axis of the screw shaft turbine compressor.

Terminology:

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The term "removable," "removably coupled," "readily removable," "threadably coupled," and similar terms, as used in this specification and appended claims, refer to structures that can be uncoupled from an adjoining structure with relative ease (i.e., non-destructively and without complicated or time consuming process), and can also be readily reattached or coupled to the previously adjoining structure.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "composite", "composites" or any version thereof refers to a solid material which is composed of two or more substances having different physical characteristics and in which each substance retains its identity while contributing desirable properties to the whole.

Figure 2:
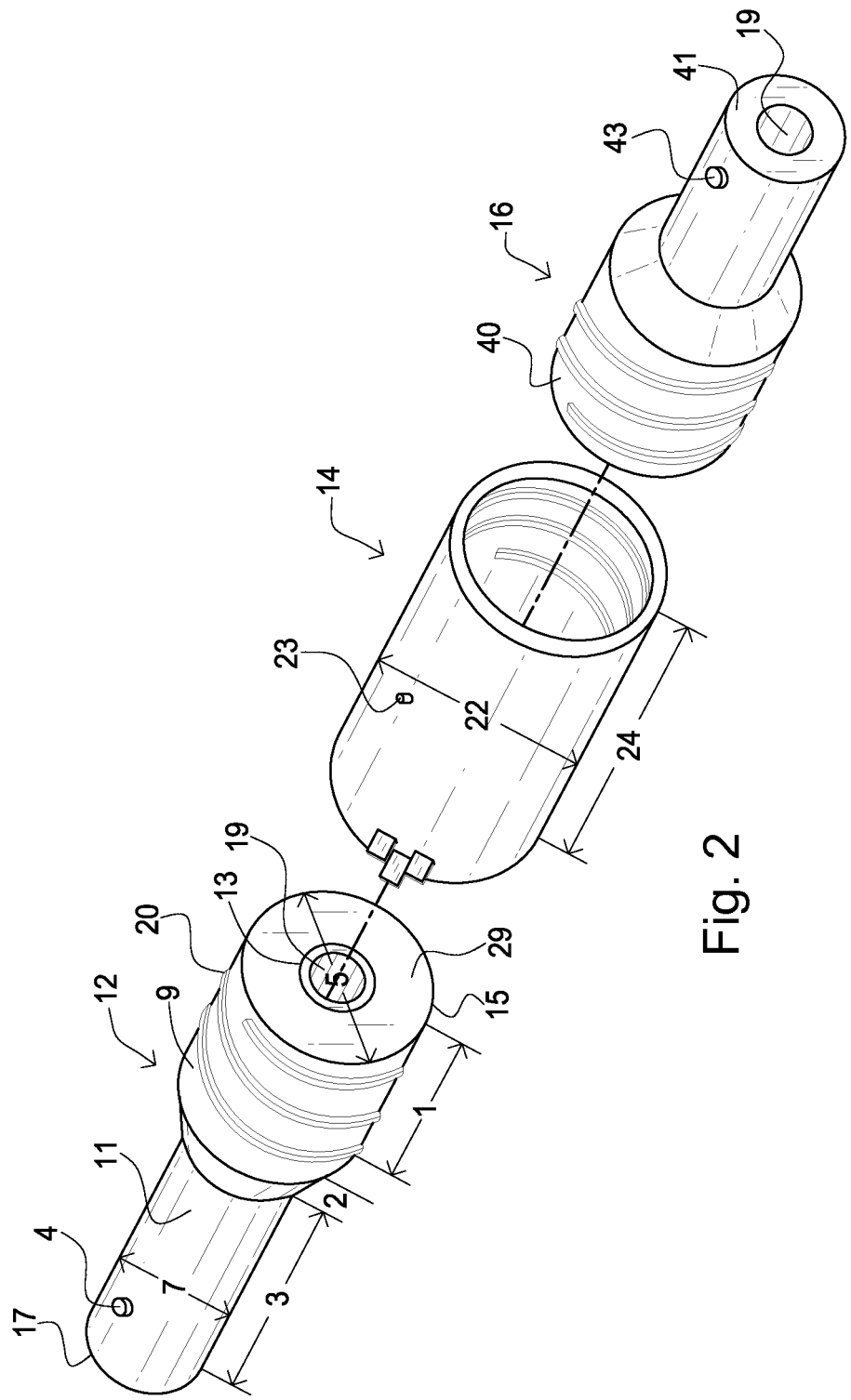
FIG. 2 is an isometric view of a compressor section, a combustion section and a turbine section of a screw shaft turbine compressor without a screw shaft according to a first embodiment of the present invention.
Figure 3:
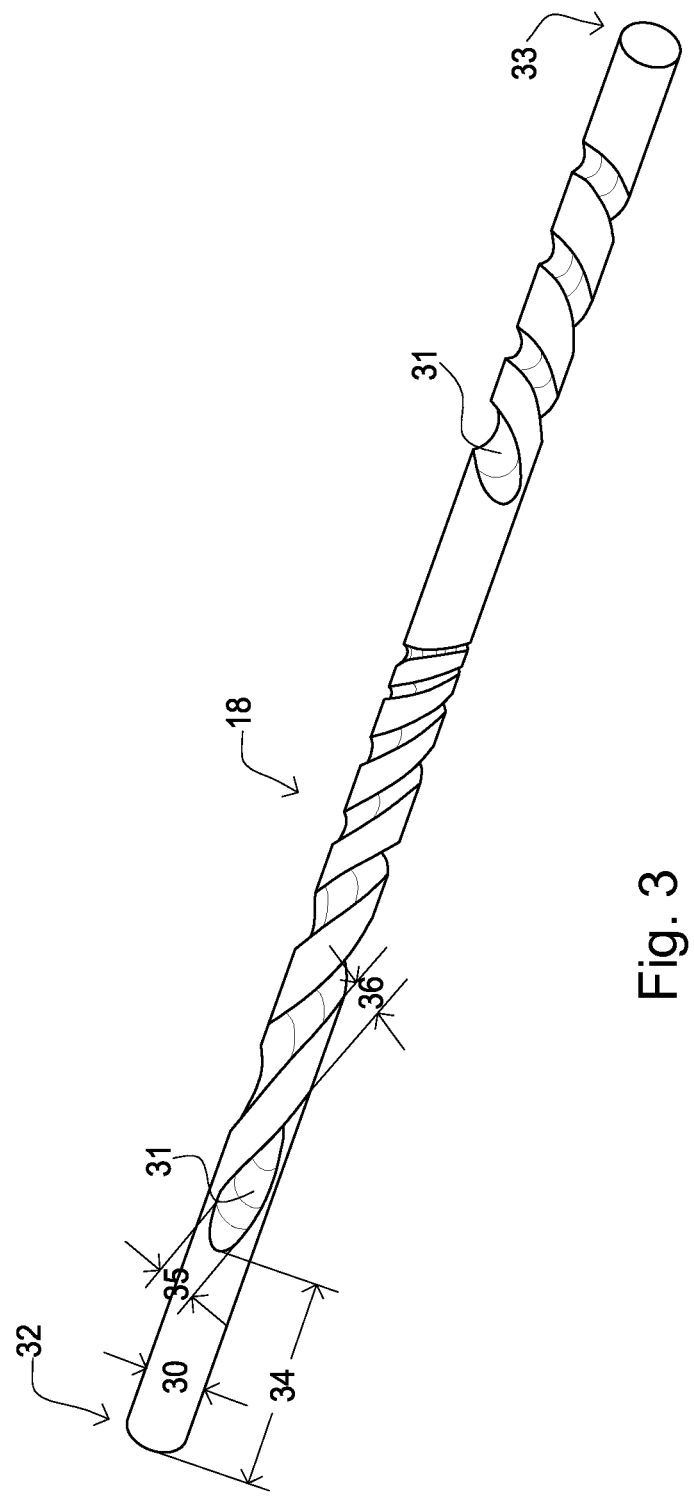
FIG. 3 is an isometric view of a screw shaft according to one embodiment.

First Embodiment of a Screw Shaft Turbine Compressor:

Referring to FIGS. 1, 2, and 3, an embodiment 10 of a screw shaft turbine compressor is shown. In one embodiment, the screw shaft turbine compressor 10 is comprised of three sections: a compressor section 12, a combustion section 14, and a turbine section 16. The screw shaft turbine compressor 19 can also include a shaft 18. As best shown in FIG. 2, the compressor section 12, the combustion section 14, and the turbine section 16 are generally cylindrically-shaped with generally circular cross-sections. Other embodiments may have only two sections or may have non-circular cross-sections as applicable.

In one embodiment, the sections are adapted to couple to each other. For example, as best shown in FIG. 2, a portion of the compressor section 12 may be comprised of a thread 20 which is adapted to mate with a threaded portion of the combustion section 14. Similarly, the combustion section may be adapted to couple with the turbine section through a set of threads adapted to mate with each other. It may be the ends of the combustion section cylinder that have the threads. Upon coupling the turbine section and compressor section to the combustion section, a combustion chamber 50 is created, as best shown in FIG. 1. One side of the combustion chamber may be comprised of the compressor section, one side of the combustion chamber may be comprised of the turbine section, and at least one combustion chamber wall may be comprised of the combustion section.

Another embodiment may be unitary in nature, such as, an embodiment having three integrated sections. Yet one embodiment may also have three sections that are coupled through means other than mating threads. Additionally, one embodiment may be comprised of only two sections or more than three sections. The two sections may be integrated or may be adapted to couple to each other. Upon coupling, the two sections may comprise a combustion chamber 50.

In a three section embodiment having a combustion section, the combustion section may have an outside diameter 22 of 8 inches and a length 24 of 6 inches. Embodiments are contemplated that have larger and smaller combustion sections, depending on the application. The combustion section is typically comprised of a material which is adapted to withstand the heat and pressure that occurs during turbine operation. For example, one combustion section may be comprised of steel or a steel alloy. Other materials, such as, but not limited to, composite materials may be used as well in an embodiment.

Included in the combustion section 14 in one embodiment is at least one ignition device 23. One embodiment is comprised of two ignition devices, as best shown in FIG. 1. The ignition device may be a device, such as, but not limited to, a spark plug, which is adapted to create an arc of electrical current between two electrodes. The arc of current creates a spark which ignites a fuel mixture in the combustion section.

In an embodiment having a combustion section 14 coupled to the compressor section 12 and the turbine section 16, fuel may enter the combustion chamber 50 through a bore 19 located in the compressor section, as best shown in FIGS. 2 and 1. The bore may extend from a compressor section proximal end 17 to a compressor section distal end 15. The longitudinal axis of the bore is generally perpendicular to the compressor section proximal and distal ends in one embodiment. Additionally, the center of the bore is generally aligned with the center of the proximal and distal ends of the compressor section in one embodiment.

Surrounding the bore 19 in the compressor section 12 in one embodiment is a bushing 13. An embodiment's bushing may not completely encircle the bore, but in one embodiment substantially surrounds the bore. The bushing may be comprised of ceramic or hardened steel. Other bushing materials are contemplated. The bushing is generally adapted to strengthen the bore. The compressor section may be comprised of a steel alloy or any other material which may be similar to the material the combustion section is comprised of.

In one embodiment, the compressor section 12 is comprised of two portions. An embodiment's first portion 11 has a first portion diameter 7 which is smaller than the diameter 5 of the second portion 9. In one compressor section embodiment, the diameter increases from the first portion to the second portion in a generally linear manner and along an increasing diameter portion of the compressor section.

The length 3 of a first portion 11 may be about 4 inches and one first portion diameter may be about 4 inches. The length of one second portion 9 may be about 4 inches and a diameter of a second portion may be about 6 inches. In an embodiment, one length 2 of the increased diameter portion is less than the length or the diameter of the first portion or the second portion. One version may have an increased diameter portion length of 1 inch.

Included in one first portion 11 of a version is at least one inlet port 4. A version may also include two inlet ports, as best shown in FIG. 1, with one inlet port bore entrance 6 opposing the other inlet port bore entrance. The inlet ports are adapted to allow air, fuel, an air-fuel mixture, or any other substance to pass through the port and into the bore 19. The longitudinal axis of the inlet ports of one embodiment are generally perpendicularly aligned with the longitudinal axis of the compressor section first portion and the bore. One inlet port may have a generally circular cross-sectional geometry, with a diameter 8 of the inlet port 4 varying over the inlet port length. The inlet port diameter in one embodiment may be larger at a bore entrance 6 than at an outer surface inlet port opening 26. One inlet port may include a device such as, but not limited to, a nozzle, adapted to release fluid into the bore. The inlet port distance 28 from the compressor section's proximal end 17 in one embodiment may be equal to about 2 inches.

Included in the compressor section 12 in one embodiment may be a support mechanism such as, but not limited to, a rotatably adapted support mechanism. One rotatably adapted support mechanism may be a bearing 27. The bearing is adapted to permit radial motion between the shaft 18 and the compressor section and may provide support to the shaft. One embodiment may use ball bearings as the bearing. Other bearings may also be used such, but not limited to, jewel bearings, fluid bearings, magnetic bearings, and flexure bearings. Fluid bearings may be gas bearings, hydrostatic bearings, hydrodynamic bearings, foil bearings, or journal bearings. Other radially adapted support mechanisms may be used.

The shaft 18 in one version is a cylindrical rod. The rod may have a generally circular cross-section. One shaft comprises a diameter 30 adapted to fit in the bore 19 in the compressor and turbine sections, as best shown in FIG. 1. In one embodiment, the shaft diameter may be about 2 inches. One shaft version has an outer surface upon which there is at least one groove 31, as best shown in FIG. 3. In one embodiment, the groove may be a spiraled or helical groove. The groove may spiral from a shaft proximal end 32 towards a shaft distal end 33. In one embodiment, the groove begins at a distance 34 from the proximal end, with one version's start distance being about 2 inches. In one embodiment, the beginning of the groove opposes the inlet port bore entrance 6, as best shown in FIG. 1. One version may have more than one groove.

To compress the mixture in one embodiment, the width 35 of the groove 31 in one embodiment decreases as the distance from the proximal end 32 of the shaft 18 increases. An ungrooved distance 36 between the grooves also decreases in one embodiment as the distance from the proximal end of the shaft increases, as best shown in FIGS. 1 and 3. The grooves may also be referred to as spirals. Other groove designs adapted to compress the mixture are also contemplated. For instance, the depth of the groove may vary along its length.

In one embodiment, the groove width 35 is less than the shaft diameter 30. A version's groove width at the groove start may be 1 inch. The proximal end 32 of the shaft in one embodiment may extend further than the proximal end 17 of the compressor section, upon the shaft being correctly placed in the compressor section, as best shown in FIG. 1. Therefore, the inlet port distance 28 in a version is less than the groove start distance 34. Upon coupling the combustion section 14 to the compressor section 12, the shaft 18 in one embodiment is adapted to extend at least from the proximal end 17 of the compressor section into the combustion chamber 50. The groove 31 in one embodiment ends after entering the combustion chamber.

However, in one embodiment, when the turbine section 16 is coupled to the combustion section 14, the shaft 18 may be a single shaft which extends through the combustion chamber 50 and into the bore 19 located in the turbine section. The groove on the shaft may begin anew at the point proximal the shaft entering a turbine section bore. The width of the groove in the turbine section may stay substantially stable throughout the turbine section, and the distance between the groove in the turbine section may stay substantially stable as well. However, the width and distance between the groves may vary as well.

One embodiment's turbine section 10 is substantially similar to the compressor section 12. However, the proximal end 40 of a turbine section may be coupled to the combustion section, whereas a distal end 15 of the compressor section may be coupled to the combustion section. Therefore, the turbine section may generally a mirror image of the compressor section, except for a conical surface, including bearings.

One difference between the compressor section and the turbine section is that the distal end surface 29 of the compressor section is generally perpendicular from the longitudinal axis of the bore 19, whereas the proximal end surface 42 of the turbine section is generally a conical surface angled towards the distal end 41 and the bore. Another difference is that the port 43 on the turbine section is not an inlet port, but is an exhaust port.

Operation of one embodiment allows for an air-fuel mixture to enter into the bore 19 of the compressor section 12 through at least one inlet port 4. As the fluid enters the bore, it is captured into the groove 31 on the shaft 19. As the shaft spins, the fluid travels towards the combustion chamber 50, being compressed in the process. Upon entering the combustion chamber, the fluid may be vaporized and ignited, with the combustion energy being directed on the shaft entering the turbine section, spinning the shaft, with the exhaust gas exiting out the exhaust port 43.

Figure 4:
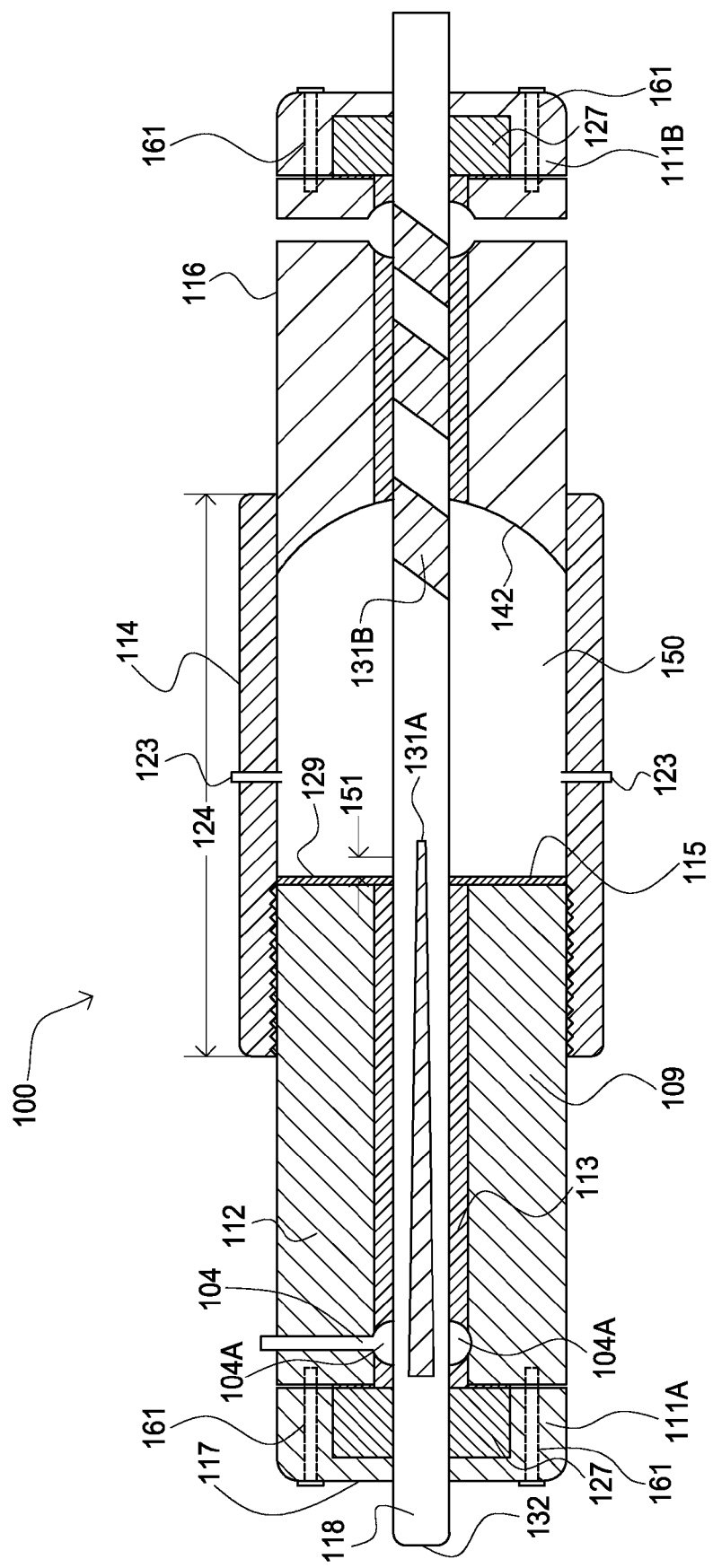
FIG. 4 is a side cut-away view of a screw shaft turbine compressor according to a second embodiment of the present invention.
Figure 5:
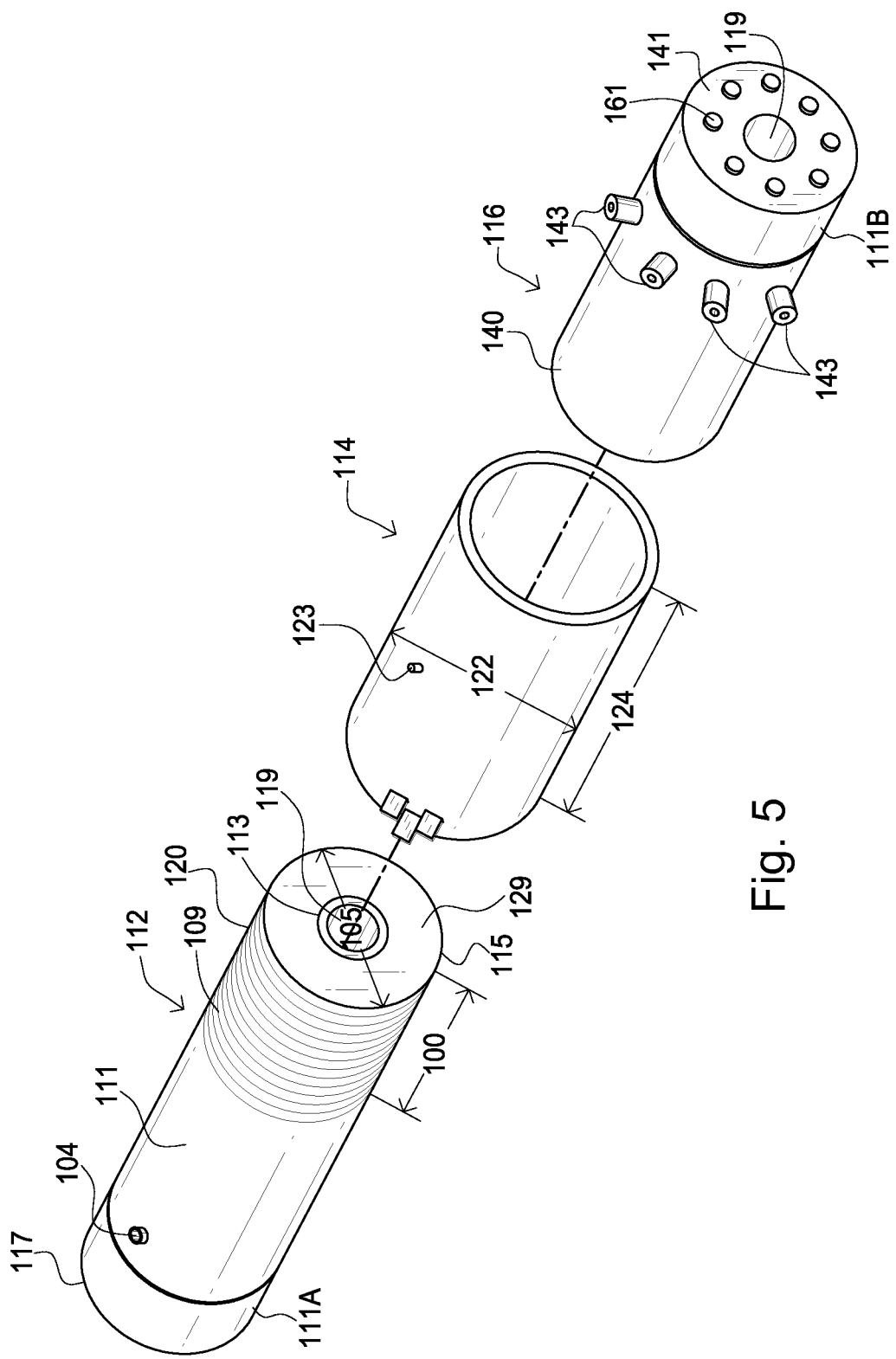
FIG. 5 is an isometric view of a compressor section, a combustion section and a turbine section of a screw shaft turbine compressor without a screw shaft according to a second embodiment of the present invention.

Second Embodiment of a Screw Shaft Turbine Compressor:

Now referring to FIGS. 4 & 5, a second embodiment of a screw shaft turbine compressor is shown. In one embodiment, the screw shaft turbine compressor 100 comprises three main sections—a compressor section 112, a combustion section 114, and a turbine section 116. The second embodiment screw shaft turbine compressor 100 also includes a shaft 118. As best shown in FIG. 8, the three sections are generally cylindrically-shaped having generally circular cross-sections. Other variations and embodiments may have only two sections or may have non circular cross-sections as applicable. For example, a variation of the second embodiment may a single unitary section combining the combustion and turbine sections 114, 116. However, in such a variation, the combustion and turbine sections 114, 116 would perform generally the same function as described herein.

Figure 7:
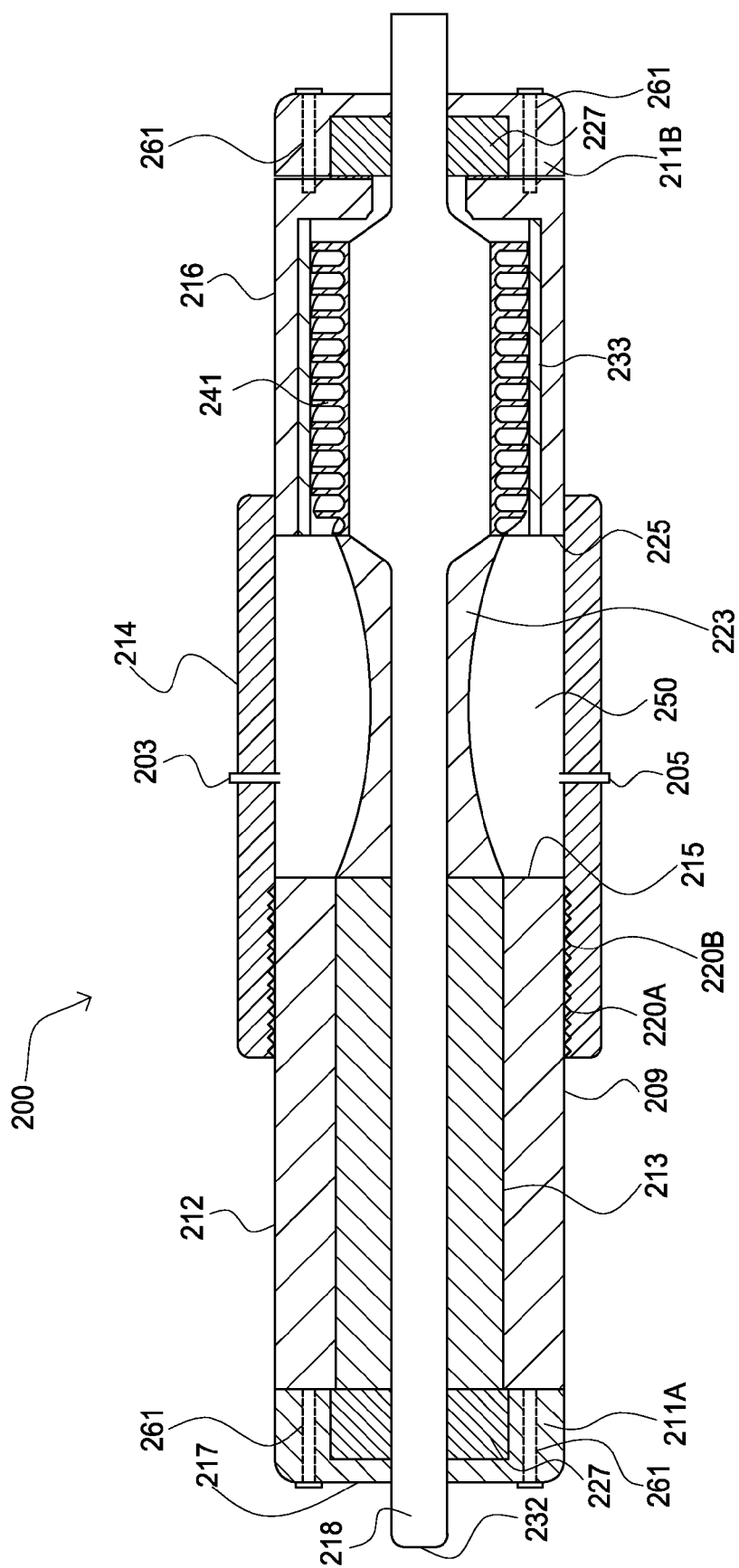
FIG. 7 is a side cut-away view of a screw shaft turbine compressor according to a third embodiment of the present invention.

Typically, the three sections 112, 114, & 116 of the second embodiment screw shaft turbine compressor 100 are coupled together in some manner. For example, as illustrated in FIG. 5, a portion of the compressor section 112 can be comprised of one or more threads 120 which are adapted to mate or threadably engage with a threaded portion of the combustion section 114. The combustion section 114 and the turbine section 116 of the second embodiment screw shaft turbine compressor 100 are typically welded or near-permanently adhered together in some fashion. However, in some variations the combustion section 114 can be adapted to couple with the turbine section 116 through one or more threads adapted to mate with each other as described with respect to the first embodiment screw shaft turbine compressor 10. Upon coupling the turbine section 116 to the combustion section 114 and the compressor section 112 to the combustion section 114, a combustion chamber 150 is created (FIG. 7). One side of the combustion chamber 150 is typically comprised of the compressor section 112, one side of the combustion chamber 150 is typically comprised of the turbine section 116, and at least one combustion chamber wall is typically comprised of the combustion section 114.

Advantageously, the threaded engagement between the compressor section 112 and combustion section 114 is adapted to enable variations in a distance 151 that an end of the one or more grooves 131a extends into the combustion chamber 150. Moreover, the one or more grooves 131 can be a straight groove as best illustrated in FIG. 7. In implementations of the second embodiment screw shaft turbine compressor 100, the straight groove can be tapered and resembles a keyway along the shaft 118. However, it is pertinent to note that the one or more grooves 131a can also be a spiraled or helical groove as described above with respect to the first embodiment screw shaft turbine compressor 10. Moreover, the one or more grooves 131a are typically adapted to increases gas pressure of an air/fuel mixture as it enters the combustion chamber 150.

Variations in the distance 151 change the amount of air/fuel mixture that can pass into the combustion chamber 150. In one implementation, the distance 151 can be such that the resulting opening serving as an ingress point for the air/fuel mixture into the combustion chamber 150 is substantially smaller then the opening of the one or more grooves 131b serving as an egress point for the exhaust.

Moreover, the coupling between the compressor section 112 and combustion section 114 is typically by threaded engagement as illustrated in FIG. 8. However, other ways of coupling these two sections together are contemplated such as but not limited to slidable engagement. The movable engagement between the compressor section 112 and the combustion section 114 allows for more precise and adjustable regulation of the air/fuel mixture flowing into the combustion chamber 150. Additionally, the compressor section 112 and combustion section 114 can be welded together when the distance 151 is a specific distance adapted a particular air/fuel mixture entering the compressor chamber 150 is desired for an implementation of the second embodiment screw shaft turbine compressor 100. However, as discussed with respect to the first embodiment screw shaft turbine compressor 10, many variations and constructions of the three sections 112, 114, & 116 including, but not limited to, a unitary embodiment are contemplated.

In one version of the second embodiment screw shaft turbine compressor 100, the combustion section 114 can have an outside diameter of approximately 11 inches whereby the threaded collar portion extending radially beyond the compressor and turbine sections 112, 116 is approximately one inch in diameter. In one version, the combustion chamber 150 comprises a length of approximately 4 inches along the general longitudinal axis. However, it is to be appreciated that other versions and embodiments that have larger and smaller combustion sections and combustion chambers therein. Moreover, the combustion section is typically comprised of materials adapted to withstand the heat and pressure conditions present during operation of the second embodiment screw shaft turbine compressor 100. For example, one implementation of the combustion section 114 can be comprised of steel or a steel alloy. Other materials, such as, but not limited to, composite materials can be used as well in a various embodiments.

Included in the combustion section 114 is at least one ignition device 123. In an exemplary embodiment, the second embodiment screw shaft turbine compressor 100 includes two ignition devices disposed on generally opposite sides of the combustion chamber 150, as best shown in FIG. 7. The at least one ignition device 123 can be a device, such as, but not limited to, a spark plug, which is adapted to create an arc of electrical current between two electrodes. The arc of current creates a spark which ignites an air/fuel mixture in the combustion chamber 150.

Typically, the air/fuel mixture enters the combustion chamber 150 through a channel created by a bore 119 extending longitudinally though the compressor section 112 and one or more grooves 131 on the shaft 118. The bore 119 typically extends longitudinally from a compressor section proximal end 117 to a compressor section distal end 115. In one implementation, the longitudinal axis of the bore 119 is generally perpendicular to the compressor section proximal and distal ends. Additionally, the center of the bore is typically generally aligned with the center of the proximal and distal ends 117, 115 of the compressor section.

In some implementations, the bore 119 is surrounded by a bushing 113. The bushing 113 may not completely encircle the bore in every implementation of the second embodiment screw shaft turbine compressor 100, but in at least one version the bushing 113 substantially surrounds the bore 119. The bushing 113 can be comprised of ceramic or hardened steel, however, other suitable materials known in the art are contemplated. The bushing 113 is generally adapted to strengthen the structural integrity of the bore 119 in relation to its operation with the shaft 118. Moreover, the bushing 113 can (and typically does) extend into the turbine section 116. It is important that the shaft 118 be closely fit in some implementations with the bushing 113 in the turbine section 116 in order to contain and direct high pressure exhaust gasses emanating from the combustion section 114. Additionally, it is important that the bushing 113 sufficiently durable and hard as to withstand the extremely high temperatures associated with the exhaust gasses emanating from the combustion section 114 through the turbine section 116.

The compressor section 112 can be comprised of a steel alloy or any other suitable material for its intended purpose. The compressor section 112 can be comprised of two portions. A compressor first portion 111a may have a generally equal diameter as that of the compressor second portion 109. The compressor first portion 111a can be removably coupled to the compressor second portion 109 via one or more fasteners 161 such as, but not limited to, screws or bolts.

In at least one implementation of the second embodiment screw shaft turbine compressor 100, the length (longitudinally with respect to the axis of the bore) of compressor first portion 111a may be about 4¼ inches and the diameter of the compressor first portion 111a may be about 9 inches. The length (longitudinally with respect to the axis of the bore) of the compressor second portion 109 may also be about 4¼ inches and the diameter of compressor second portion 109 may also be about 9 inches.

One or more inlet ports 104 are included in the compressor section 112, typically in the compressor second portion 109. As illustrated in FIG. 7, only one inlet port 104 is disposed on the compressor second portion 109. However, other versions or implementations can include two or more inlet ports. At an end of the inlet port proximal the bore, an arcuate or dome-like cavity 104a typically surrounds the entire bore 119 and shaft 118 therein. The one or more inlet ports 104 are adapted to allow air, fuel, air/fuel mixture, or any other fluid or suitable substance to pass through the inlet port 104, then into the cavity 104a of the inlet port 104, and into the bore 119. The longitudinal axis of the inlet port 104 is typically perpendicularly aligned with the longitudinal axis of the compressor second portion 109 and the bore 119. Moreover, an aperture and connector end of the inlet port 104 typically extend radially from the axis of the bore 119. In some variations, the inlet port 104 may include a device such as, but not limited to, a nozzle, adapted to release fluid into the bore 119. The nozzle, or a valve, may also eliminate or reduce backflow of exhaust into the inlet port 104 that may occur during combustion. Moreover, the nozzle or valve to eliminate or reduce backflow of exhaust may be disposed closer to the combustion chamber 150 in some implementations. Additionally, to substantially reduce backflow of exhaust from combustion within the combustion chamber 150, the cross-sectional area or opening related to the air/fuel mixture input (coming from the compressor section 112) can be made significantly smaller than the cross-sectional area or opening related to the exhaust egress (provided by the turbine section 116). For example, in one implementation, the compressor section 112 and combustion section 114 can be adjusted so that effectively a pinhole provides the input into the combustion chamber 150.

A rotatably adapted support mechanism such as, but not limited to, a bearing 127 is typically included in the compressor first portion 111a. However, the support mechanism can be located in the compressor second portion 109 in some implementations as well. The bearing 127 is generally adapted to permit rotational motion between the shaft 118 and the compressor section 112. A version of the bearing 127 can include ball bearings. However, other versions bearings can also be used such, but not limited to, jewel bearings, fluid bearings, magnetic bearings, and flexure bearings. Fluid bearings may be gas bearings, hydrostatic bearings, hydrodynamic bearings, foil bearings, or journal bearings. It is to be appreciated that other radially adapted support mechanisms may be used alternatively or in conjunction with the bearing 127.

The shaft 118 is typically a cylindrical rod having a generally circular cross-section. The shaft 118 typically comprises a diameter adapted to fit into the bore 119 in the compressor and turbine sections 112, 116, as best illustrated in FIG. 7. In one version, the shaft 118 has a diameter of 2.1867 inches. The shaft 118 typically includes one or more grooves 131. In a version of the shaft 118, the one or more grooves 131 can comprise a first groove 131a and a second groove 131b. With respect to the shaft 118, in an implementation of the one or more grooves 131 the first groove 131a is disposed proximal a shaft first end 132 and the second groove 131b is disposed distal the shaft first end 132.

The first groove 131a can comprise an elongated channel extending longitudinally with respect to the axis of the shaft 118. The elongated channel can be a generally quadrilateral polygon cutout from the surface of the shaft 118. The elongated channel generally extends from the one or more inlet ports 104 to the combustion chamber 150. The elongated channel can also be slightly tapered wherein the width at an end proximal the combustion chamber 150 is narrower than the end distal the combustion chamber 150. In some implementation, the elongated channel can resemble a keyway along the shaft 118. Additionally, the first groove 131a of the one or more grooves 131 can comprise a plurality of elongated channels extending from the one or more inlet ports 104 to the combustion chamber 150. It is also pertinent to note that the first groove 131a can also comprise a number of groove shapes such as, but not limited to, a spiraled or helical groove.

The second groove 131b of the one or more grooves 131 typically comprises a spiraled or helical groove. The second groove 131b generally extends from the combustion chamber 150 to the one or more exhaust ports 143. In various implementations of both the first and second embodiment screw shaft turbine compressors 10 & 100, an angle of the spiraled or helical groove with respect to the longitudinal axis of the shaft 118 can be varied to speed to torque ratios. Thus, a method of generating different speed to torque ratios on the shaft using embodiments of the screw shaft turbine compressor includes varying the angle to achieve the desired result. The angle is typically between approximately 30 and 70 degrees. In implementations where maximum power is desired, the angle can be very steep with the angle at approximately 60-70 degrees. The angle is best illustrated in FIG. 3 with respect to the first embodiment. Looking at the second groove 31 towards the shaft distal end 33, the angle is formed the relative center of the groove or channel (as would be best seen if the shaft 18 were dissected in a longitudinal cross-section) relative to the longitudinal axis of the shaft 18. In some implementations, the width of the second groove 31 in the turbine section can stay substantially stable throughout the turbine section. Moreover, the distance between adjacent turns of the second groove 31 in the turbine section may stay substantially stable as well. However, other implementations with varied widths and distances between adjacent turns are contemplated.

To compress the air/fuel mixture in the second embodiment screw shaft turbine compressor 100, the width of the straight groove 131a can be decreased as the distance from the shaft first end 132 of the shaft 118 increases. An ungrooved distance between the grooves 131a and 131b along the shaft 118 typically resides in the combustion chamber 150 as best illustrated in FIG. 7. It is pertinent to note that other groove designs adapted to compress the mixture are also contemplated. For example, the depth of the groove may vary along its length.

The shaft first end 132 may extend further than the compressor section proximal end 117, particularly when the shaft 118 is to be operatively coupled with another device or element. The shaft 118 typically is a single shaft which extends through the combustion chamber 150 and into the bore 119 located in the turbine section 116. The groove on the shaft may begin anew at the point proximal the shaft 118 entering the turbine section bore.

As illustrated in FIGS. 4 & 5, the turbine section 116 can be substantially similar to the compressor section 112. However, the proximal end of the turbine section 116 can be coupled to the combustion section 114, whereas the distal end of the compressor section 112 can be coupled to the combustion section 114. A difference between the compressor section and the turbine section is that a distal end surface 129 of the compressor section 112 is typically perpendicular from the longitudinal axis of the bore 119, whereas the proximal end surface 142 of the turbine section 116 is typically a generally concave surface with respect to the combustion chamber 150 formed by these surfaces. The turbine section 116 can also be comprised of two portions. A turbine first portion 111b may have a generally equal diameter as that of the turbine second portion adjacent thereto. The turbine first portion 111b can be removably coupled to the turbine second portion via one or more fasteners 161 such as, but not limited to, screws or bolts.

As similarly described with respect to the compressor section 112, a rotatably adapted support mechanism such as, but not limited to, a bearing 127 is typically included in the turbine first portion 111b of the turbine section 116. However, the support mechanism can be located in the turbine second portion in some implementations as well. The bearing 127 is generally adapted to permit rotational motion between the shaft 118 and the compressor section 112. The removable coupling of the bearings 127 in both the compressor section 112 and the turbine section 116 enable easier maintenance or repair of the bearings 127, as well as maintenance, repair, and/or replacement (pursuant to design choices, for instance) of the shaft 118.

In operation, an air/fuel mixture or fluid enters into the bore 119 of the compressor section 112 through one or more inlet ports 104. As the air/fuel mixture enters the bore 119, it is captured into the groove 131a on the shaft 118. As the shaft 118 spins and/or the air/fuel mixture is forced into the one or more inlet ports 104, the air/fuel mixture travels towards the combustion chamber 150. As previously discussed, the air/fuel mixture can be compressed in the process. Upon entering the combustion chamber 150, the air/fuel mixture can be ignited. The combustion energy caused by ignition can be directed on the shaft 118 entering the turbine section 116, thereby spinning the shaft 118 while the exhaust gas exits out the one or more exhaust ports 143. Ignition timing can vary depending on the specific implementation of the second embodiment screw shaft turbine compressor 100.

An Exemplary Embodiment of a System for Generating Torque on a Shaft

Figure 6:
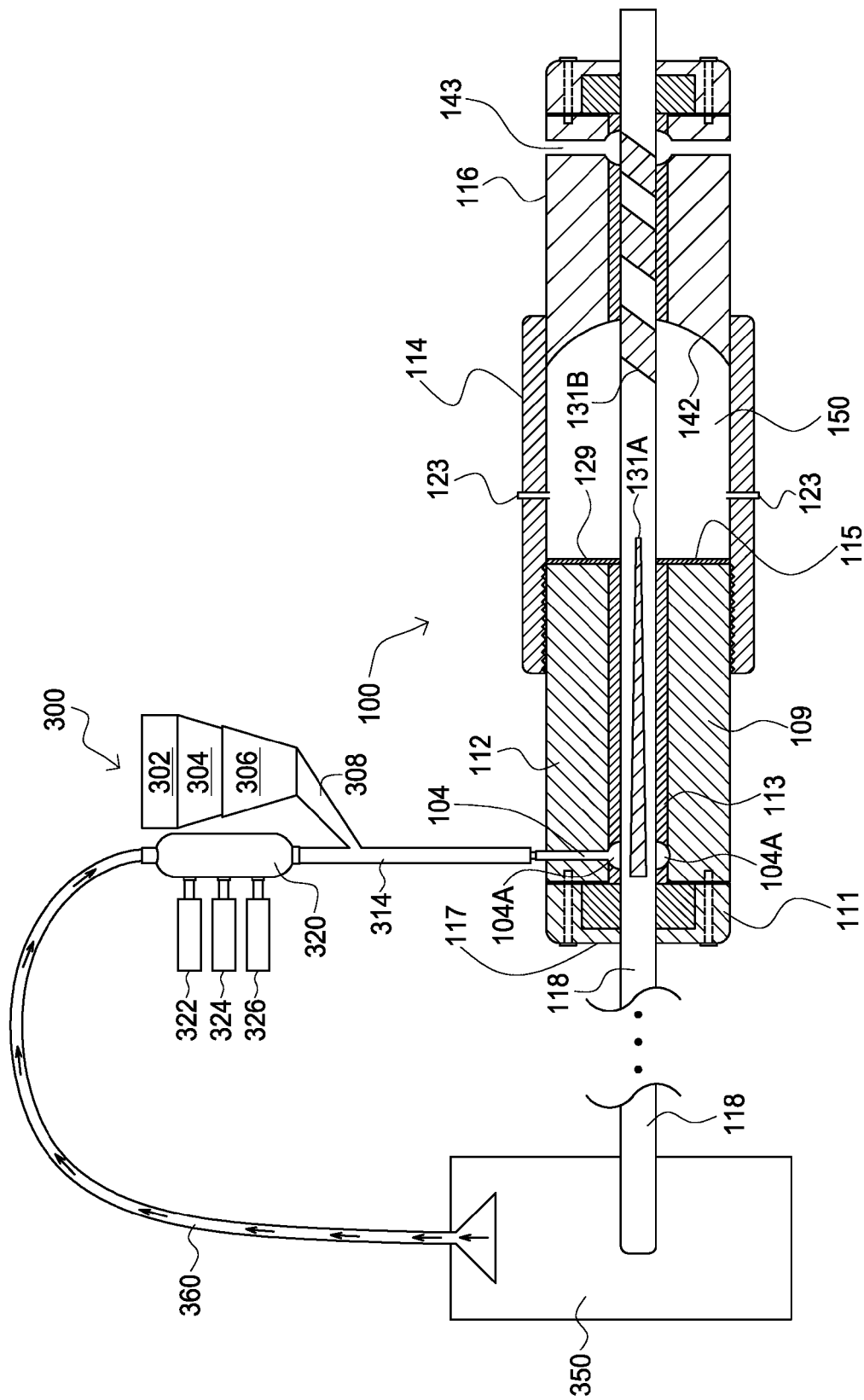
FIG. 6 is a side cut-away and plan view of a system for generating torque on a shaft according to an embodiment of the present invention.

Now referring to FIG. 6, an exemplary embodiment of a system for generating torque on a shaft is shown. A second embodiment screw shaft turbine compressor 100 may be used in the system. As previously described, the second embodiment screw shaft turbine compressor 100 comprises three main sections—a compressor section 112, a combustion section 114, and a turbine section 116. The system also comprises a shaft 118 (which may be considered part of the shaft turbine compressor or part of the system) that extends though the second screw shaft turbine compressor 100. The shaft 118 is rotatably coupled to the compressor section 112 and the turbine section 116. It is pertinent to note that all contemplated embodiments and variation of the screw shaft turbine compressor described above can be used in the system.

Generally, the compressor section 112 comprises a compressor section bore and one or more inlet ports 104. The one or more inlet ports 104 are adapted to provide an air/fuel mixture to the compressor section bore. The combustion section 114 is operatively coupled to the compressor section 112. The combustion section 114 comprises a combustion chamber 150 and at least one ignition device 123. The turbine section 116 is operatively coupled to the combustion section 114. The turbine section 116 comprises a turbine section bore and one or more exhaust ports 143. The one or more exhaust ports 143 are adapted to release exhaust from the turbine section bore. A circumferential channel may extend around the turbine section bore to the one or more exhaust ports 143 in a similar fashion as the circumferential channel or domed ring-like cavity 104a used in conjunction with the inlet ports 104.

The system can also comprise an air compressor 350 and a fuel delivery assembly 300. The air compressor 350 is operatively coupled to the shaft 118 typically proximal the compressor section proximal end 117. The shaft 118 generally extend from the air compressor 350 through the compressor section 112, the combustion section 114, and then through the turbine section 116 where the shaft 118 can operatively couple to a source or device adapted to receive torque (e.g., a generator or other industrial applications). The air compressor 350 is further operatively coupled to the fuel delivery assembly 300 whereby a conduit 360 supplies forced air into a manifold 320 of the fuel delivery assembly 300.

The fuel delivery assembly 300 comprises one or more fuel sources which combine in or proximal the manifold 320 to create the air/fuel mixture. For example, the one or more fuel sources can comprise a source 322 for propane, a source 324 for various hydrocarbons, and a source 326 for alcohols. Moreover, the fuel delivery assembly 300 can comprise a bin 302 for wood and/or coal, a hopper 304, and a crusher 306. The crushed wood and/or coal can be injected via a control flow nozzle 308. The entire air/fuel mixture is then injected into the one or more inlet ports 104 via a conduit 314 into the compressor section 112.

Similar to embodiments of the screw shaft turbine compressor, embodiments of the system for generating torque on a shaft include one or more grooves of various shapes and sizes. For example, the one or more grooves 131 can include one or more helically-shaped grooves 131b disposed on the shaft 118 along at least a portion of the combustion section 114 and at least a portion of the turbine section 116. Additionally, the one or more grooves 131 can include one or more generally straight grooves 131a disposed on the shaft 118 along at least a portion of the compressor section 112 and at least a portion of the combustion section 114. Hence, the variations and implementations of embodiments of the screw shaft turbine compressor can be applied to the system in order to customize it a given application.

Third Embodiment of a Screw Shaft Turbine Compressor:

Now referring to FIGS. 7-10, a third embodiment 200 of a screw shaft turbine compressor is shown. Generally, the screw shaft turbine compressor 200 can include a compressor section 212, a combustion section 214, a turbine section 216, and a shaft 218. Similar to the second embodiment compressor 100, the third embodiment compressor 200 sections 212, 214, and 216 can generally be cylindrically-shaped having generally circular cross-sections. Other variations and embodiments may have only two sections or may have non-circular cross-sections, as applicable. For example, a variation of the third embodiment compressor 200 may include a single unitary section combining the combustion section 214 and the turbine section 216. However, in such a variation, the combustion section 214 and the turbine section 216 would perform generally a similar function as described herein. In one embodiment, the compressor section 212, the combustion section 214, and the turbine section 216 can be a single housing.

Typically, the compressor section 212, the combustion section 214, and the turbine section 216 of the third embodiment compressor 200 can be coupled together in some manner. For example, as illustrated in FIG. 7, a portion of the compressor section 212 can be comprised of one or more threads 220a which are adapted to mate or threadably engage with a threaded portion 220b of the combustion section 214. The combustion section 214 and the turbine section 216 of the third embodiment compressor 200 are typically welded or near-permanently adhered together in some fashion. For instance, the sections 214, 216 can be interference fitted or compression fittings can be implemented to couple the sections 214, 216 together. However, in some embodiments, the combustion section 214 can be adapted to couple with the turbine section 216 through one or more threads adapted to mate with each other as described with respect to the first embodiment screw shaft turbine compressor 10.

Upon coupling the turbine section 216 to the combustion section 214 and the compressor section 212 to the combustion section 214, a combustion chamber 250 can be created, as shown in FIG. 7. A first side of the combustion chamber 250 can typically be comprised of the compressor section 212, a second side of the combustion chamber 250 can typically be comprised of the turbine section 216, and at least one combustion chamber wall can typically be comprised of the combustion section 214.

Generally, the coupling between the compressor section 212 and combustion section 214 can be by threaded engagement as illustrated in FIG. 7. However, other means and methods of coupling the compressor section 212 and the combustion section 214 together are contemplated including, but not limited to, a slidable engagement. The slidable engagement between the compressor section 212 and the combustion section 214 can allow for a more precise and adjustable regulation of an air/fuel mixture flowing into the combustion chamber 250. However, as discussed with respect to the first embodiment screw shaft turbine compressor 10, many variations and constructions of the three sections 212, 214, and 216 including, but not limited to, a unitary embodiment are contemplated.

In one embodiment, the combustion section 214 can have an outside diameter of approximately 11 inches, whereby a threaded collar portion extending radially beyond the compressor section 212 and the turbine section 216 can be approximately one inch in diameter.

In one embodiment, the compressor section 212 can comprise a length of approximately 18-20 inches along a general longitudinal axis, the combustion section 214 can comprise a length of approximately 24-26 inches along a general longitudinal axis, and the turbine section 216 can comprise a length of approximately 24-26 inches along a general longitudinal axis. It is to be appreciated that other versions and embodiments having larger and smaller compressor sections, combustion sections, turbine sections, and combustion chambers therein are contemplated. The combustion section 214 can typically be comprised of materials adapted to withstand the heat and pressure conditions present during operation of the third embodiment compressor 200. For example, the combustion section 214 can be comprised of steel or a steel alloy. It is to be appreciated that other materials including, but not limited to, composite materials can be used as well in various embodiments.

Generally, the third embodiment compressor 200 can include at least one ignition device 203. In one embodiment, the third embodiment compressor 200 can include two ignition devices disposed on generally opposite sides of the combustion chamber 250. The ignition device 203 can be a device including, but not limited to, a spark plug and a flame igniter. The spark plug 203 can be adapted to create an arc of electrical current between two electrodes. The arc of current can create a spark that ignites an air/fuel mixture in the combustion chamber 250. Ignition timing can vary depending on an implementation of the ignition device 203. In one embodiment, the ignition timing of the ignition device 203 can be manually altered. In another embodiment, the ignition timing of the ignition device 203 can be controlled by an ignition system.

Figure 8B:
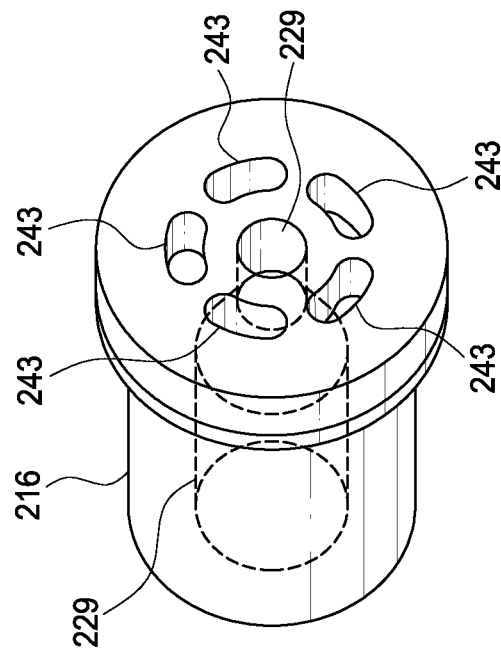
FIG. 8B is a perspective view of a turbine section of a screw shaft turbine compressor according to a third embodiment of the present invention.
Figure 8A:
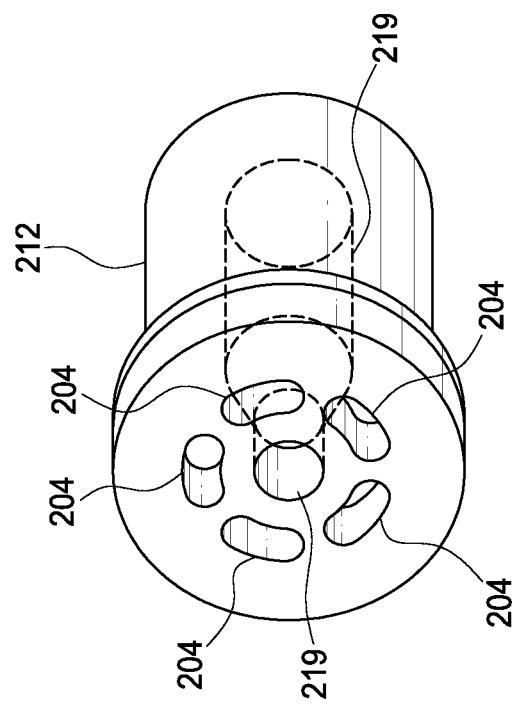
FIG. 8A is a perspective view of a compressor section of a screw shaft turbine compressor according to a third embodiment of the present invention.

The compressor section 212 can include a first bore 219 extending longitudinally though the compressor section 212, as shown in FIG. 8A. The first bore 219 typically extends longitudinally from a proximal end 217 of the compressor section 212 to a distal end 215 of the compressor section 212. In one implementation, a longitudinal axis of the compressor section bore 219 is generally perpendicular to the proximal and distal ends 217, 215 of the compressor section 212. Additionally, a center of the bore 219 is typically generally aligned with the center of the proximal and distal ends 217, 215 of the compressor section 212. A second bore 229 can extend longitudinally through the turbine section 216, as shown in FIG. 8B. The turbine section bore 229 can be generally perpendicular to proximal and distal ends of the turbine section 216. In one embodiment, the turbine section bore 229 can have a larger diameter than the compressor section bore 219.

In one embodiment, the compressor section 212 can include a bushing 213. The compressor section bushing 213 can be adapted to fit inside the bore 219. Typically, air can enter the combustion chamber 250 through one or more channels 221 on the compressor section bushing 213. Generally, the compressor section bushing 213 can be comprised of ceramic or hardened steel, however, other suitable materials known in the art are contemplated.

Figure 10:
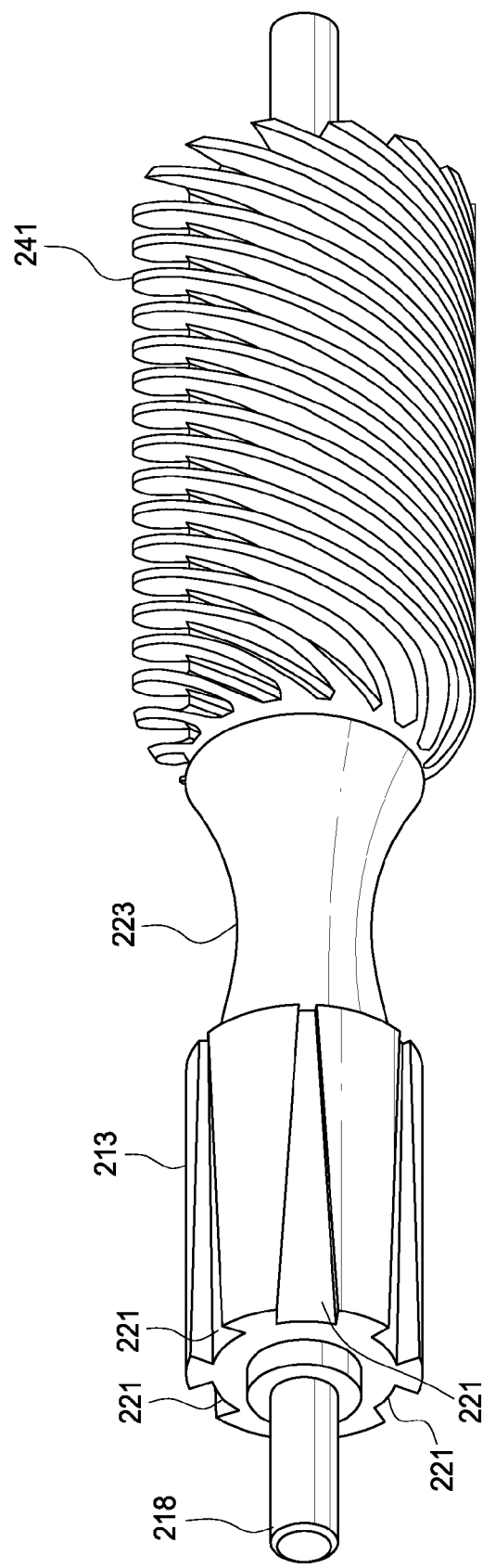
FIG. 10 is an isometric view of a screw shaft and bushings according to a third embodiment of the present invention.

The compressor section bushing 213 can have a generally cylindrical shape with the one or more channels 221 on an exterior of the bushing 213, as shown in FIG. 10. In one embodiment, the one or more channels 221 can have a wedge or tapered shape. In another embodiment, the one or more channels 221 can have a helical shape. The one or more channels 221 can be adapted to compress gases as they enter the combustion chamber 250.

The compressor section bushing 213 can be removably coupled to the compressor section 212. In one embodiment, one or more spacers can be implemented to removably couple the compressor section bushing 213 to the compressor section 212. Generally, the spacers can be coupled to the compressor section 212 by fasteners including, but not limited to, screws and bolts. In one embodiment, the compressor section bushing 213 can be friction fitted inside the compressor section bore 219.

In one embodiment, the combustion section 214 can include a bushing 223 coupled to the compressor section bushing 213, as shown in FIGS. 7 and 10. For instance, the combustion section bushing 223 can be threadably coupled to the compressor section bushing 213. In another instance, the combustion section bushing 223 can be removably coupled to the compressor section bushing 213 via one or more fasteners including, but not limited to, screws or bolts. The combustion section bushing 223 can have a generally concave cylindrical shape, as shown in FIGS. 7 and 10. The combustion section bushing 223 can be adapted to deliver exhaust from the combustion chamber 250 to a portion of the shaft 218 in the turbine section 216.

The turbine section 216 can include a bushing 233. The turbine section bushing 233 can have a generally cylindrical shape. In one embodiment, the turbine section bushing 233 can be friction fitted to the turbine section 216. The turbine section bushing 233 can be adapted to ensure exhaust from the combustion chamber 250 interfaces with the portion of the shaft 218 in the turbine section 218.

The compressor section bushing 213 and the turbine section bushing 233 can generally be adapted to strengthen a structural integrity of the compressor section bore 219 and the turbine section bore 229 in relation to an operation of the bores 219, 229 with the shaft 218. It is important that the shaft 218 be closely fit in some implementations with the turbine section bushing 223 in the turbine section 216 in order to contain and direct high pressure exhaust gasses emanating from the combustion chamber 250. Additionally, it is important that the turbine section bushing 223 is sufficiently durable and hard as to withstand the extremely high temperatures associated with exhaust gasses emanating from the combustion chamber 250 through the turbine section 216.

The compressor section 212 can be comprised of a steel alloy or any other suitable material for its intended purpose. The compressor section 212 can be comprised of two portions. A compressor first portion 211a may have a generally equal diameter as that of a compressor second portion 209. The compressor first portion 211a can be removably coupled to the compressor second portion 209 via one or more fasteners 261 such as, but not limited to, screws or bolts.

In one implementation of the third embodiment compressor 200, a longitudinal length, with respect to the axis of the bore 219, of the compressor first portion 211a may be about 4¼ inches and a diameter of the compressor first portion 211a may be about 12 inches. A longitudinal length, with respect to the axis of the bore 219, of the compressor second portion 209 may be about 4¼ inches and a diameter of the compressor second portion 209 may be about 12 inches.

One or more inlet ports 204 can be included in the compressor section 212, typically in the compressor first portion 211a. As shown in FIG. 8A, a plurality of inlet ports 204 are disposed on the proximal end 217 of the compressor first portion 211a. However, other versions or implementations can include one or more inlet ports similar to the inlet ports 104 of the second embodiment compressor 100. The inlet ports 204 are adapted to allow air, fuel, air/fuel mixture, or any other fluid or suitable substance to pass through the inlet ports 204. A longitudinal axis of the inlet ports 204 can typically be parallelly aligned with a longitudinal axis of the compressor first portion 211a. In one embodiment, the inlet ports 204 can be adapted to direct air into the channels 221 of the compressor section bushing 213 and the compressor section bore 219.

In some embodiments, the inlet ports 204 can include a device including, but not limited to, a nozzle or valve adapted to release fluid into the bore 219. The nozzle or valve may also eliminate and/or reduce backflow of exhaust into the inlet ports 204 that may occur during combustion. In one embodiment, the nozzle or valve may be disposed closer to the combustion chamber 250 to eliminate or reduce backflow of exhaust. Additionally, to substantially reduce backflow of exhaust from combustion within the combustion chamber 250, a cross-sectional area or opening related to the air input (coming from the compressor section 212) can be made significantly smaller than the cross-sectional area or opening related to the exhaust egress (provided by the turbine section 216). For example, in one implementation, the compressor section 212 and the combustion section 214 can be adjusted so that effectively a pinhole sized aperture provides input into the combustion chamber 250.

Generally, a fuel injector 205 can be included with the combustion section 214. In one embodiment, at least two fuel injectors 205 can be included in the third embodiment compressor 200. In one embodiment, the fuel injectors 205 can be located near a distal end 215 of the compressor section 212. For instance, the fuel injectors 205 can be located such that fuel injected by the fuel injector interfaces with air entering the combustion chamber 250 through the bushing grooves 221. In one embodiment, the fuel injector 205 can be part of an electronic fuel injection system. In another embodiment, the fuel injector 205 can be part of a mechanical fuel injection system. It is to be appreciated that the fuel injectors 205 would need to be connected to a source of fuel.

A rotatably adapted support mechanism 227 including, but not limited to, a bearing can typically be included in the compressor first portion 211a. However, the support mechanism 227 can be located in the compressor second portion 209 in some implementations as well. The bearing 227 can generally be adapted to permit rotational motion between the shaft 218 and the compressor section 212. In one embodiment, the bearing 227 can include ball bearings. However, other embodiments of the bearing 227 can include, but are not limited to, jewel bearings, fluid bearings, magnetic bearings, and flexure bearings. Fluid bearings may be gas bearings, hydrostatic bearings, hydrodynamic bearings, foil bearings, or journal bearings. It is to be appreciated that other radially adapted support mechanisms may be used alternatively or in conjunction with the bearing 227.

As illustrated in FIGS. 7 and 8B, the turbine section 216 can be substantially similar to the compressor section 212. However, a proximal end of the turbine section 216 can be coupled to the combustion section 214, whereas the distal end of the compressor section 212 can be coupled to the combustion section 214. The turbine section 216 can also be comprised of two portions. A turbine first portion 211b may have a generally equal diameter as that of a turbine second portion adjacent thereto. The turbine first portion 211b can be removably coupled to the turbine second portion via one or more fasteners 261 including, but not limited to, screws or bolts. One or more exhaust ports 243 can be included in the turbine section 216, typically in the turbine first portion 211b, as shown in FIG. 8B.

As similarly described with respect to the compressor section 212, a rotatably adapted support mechanism 227 including, but not limited to, a bearing is typically included in the turbine first portion 211b of the turbine section 216. However, the support mechanism 227 can be located in the turbine second portion in some implementations as well. The bearing 227 is generally adapted to permit rotational motion between the shaft 218 and the compressor section 212. The removable coupling of the bearings 227 in both the compressor section 212 and the turbine section 216 enable easier maintenance or repair of the bearings 227, as well as maintenance, repair, and/or replacement (pursuant to design choices, for instance) of the shaft 218.

The shaft 218 can typically be a cylindrical rod having a generally circular cross-section. The shaft 218 can comprise a diameter adapted to fit into the first bore 219 in the compressor section 212 and the second bore 229 in the turbine section 216. In one embodiment, a first portion of the shaft 218 can have a diameter of 2.1867 inches. A second portion of the shaft 218 can have a diameter of between 6-12 inches. It is to be appreciated that a diameter of the second portion of the shaft 218 can be varied to meet different design criteria.

Generally, a first end 232 of the shaft 218 may extend further than the compressor section proximal end 217, particularly when the shaft 218 is to be operatively coupled with another device or element. The shaft 218 can typically be a single shaft which extends through the combustion chamber 250 and into the second bore 229 located in the turbine section 216.

Figure 9:
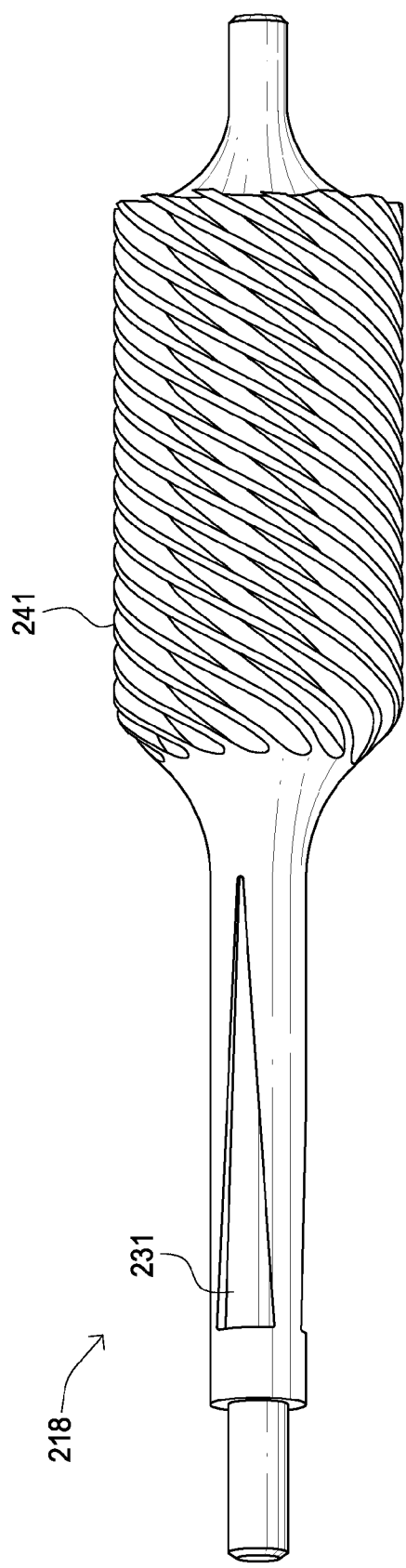
FIG. 9 is an isometric view of a screw shaft according to a third embodiment of the present invention.

As shown in FIG. 9, the shaft 218 typically includes one or more grooves 231. The one or more grooves 231 can each include an elongated channel extending longitudinally with respect to an axis of the shaft 218. The elongated channels 231 can be a generally quadrilateral polygon cutout from a surface of the shaft 218. The elongated channels 231 generally extend from the one or more inlet ports 204 to the turbine section 216. The elongated channels 231 can also be slightly tapered wherein the width at an end proximal the combustion chamber 250 is narrower than an end distal the combustion chamber 250. For instance, the elongated channels 231 can resemble a keyway along the shaft 218.

Additionally, the one or more grooves 231 can comprise a plurality of elongated channels extending from the one or more inlet ports 204 to the turbine section 216. It is also pertinent to note that the one or more grooves 231 can also comprise a number of groove shapes including, but not limited to, a spiraled or helical groove.

In one embodiment, the one more grooves 231 can be tapered and resemble a keyway along the shaft 218. However, it is pertinent to note that the one or more grooves 231 can also be a spiraled or helical groove as described above with respect to the first embodiment screw shaft turbine compressor 10. Moreover, the one or more grooves 231 are typically adapted to increases gas pressure of air as it enters the combustion chamber 250 and the turbine section 216.

In some embodiments, the shaft 218 can be widened starting at a proximal end 225 of the turbine section 216, as shown in FIGS. 7, 9, and 10. For instance, the widened portion of the shaft 218 can have a diameter that is 1.5-4 times a diameter of a portion of the shaft 218 in the compressor section 212. Typically, the widened portion of the shaft 218 can include one or more grooves 241. The one or more grooves 241 generally comprise a spiraled or helical groove and can extend from a distal end of the combustion chamber 250 to the one or more exhaust ports 243. The one or more exhaust ports 243 can be adapted to release exhaust from the turbine section 216. In one embodiment, a longitudinal axis of the exhaust ports 243 can typically be parallelly aligned with a longitudinal axis of a turbine first portion 211b.

In another embodiment, a tubular structure having helical grooves can be attached to the shaft 218. Generally, the tubular structure can be concentrically attached to the shaft 218, such that the tubular structure acts like a sleeve for the shaft 218. The tubular structure can be operatively coupled such that when the tubular structure rotates, the shaft 218 rotates, or alternatively when the shaft 218 rotates, the tubular structure rotates.

It is to be appreciated that an angle and depth of the spiraled or helical grooves 241, with respect to the longitudinal axis of the shaft 218, can be varied to vary speed to torque ratios. Further, the number of helical grooves on the shaft 218 can be altered. For instance, a method of generating different speed to torque ratios on the shaft 218 using embodiments of the third embodiment compressor 200 can include, but is not limited to, varying an angle of the helical grooves 241 and/or increasing the number of helical spirals to achieve a desired result. Typically, the helical grooves 241 can be between approximately 30-70 degrees. In one embodiment, where maximum power is desired, an angle of the helical grooves 241 can be very steep with the angle at approximately 60-70 degrees.

Looking at the helical grooves 241, the angle can be formed relative to a center of the groove (as would be best seen if the shaft 218 were dissected in a longitudinal cross-section) relative to a longitudinal axis of the shaft 218. In some embodiments, a width of the helical grooves 241 in the turbine section can stay substantially stable throughout the turbine section. Moreover, the distance between adjacent turns of the helical grooves 241 in the turbine section may stay substantially stable as well. However, other implementations with varied widths and distances between adjacent turns are contemplated.

To compress air in the third embodiment compressor 200, a width of the shaft grooves 231 and a width of the bushing grooves 221 can both be decreased as a distance from the shaft first end 232 of the shaft 218 increases. It is pertinent to note that other groove designs adapted to compress the mixture are also contemplated. For example, a depth of the shaft grooves 231 and the bushing grooves 221 may vary along a length of the shaft 218 and bushing 213 in the compressor section 212.

In operation, air enters into third embodiment compressor 200 by the inlet ports 204. Air is then directed to the bore 219 and the bushing grooves 221 on the bushing 213. As air enters the bore 219, air is captured into the grooves 231 on the shaft 218. Generally, air that passes through the bore 219 is introduced to the helical grooves 241 on the widened portion of the shaft 218 in the combustion chamber 250. The grooves 231 on the shaft 218 act to compress the air before the air engages the helical grooves 241. Further, air interfacing with the shaft grooves 231 can act to cool the shaft 218 in the combustion chamber 250. Further, air from the shaft grooves 231 can supply oxygen to burn any unburned fuel entering the turbine section 216.

As air is delivered to the combustion chamber 250 via the bushing grooves 221, the bushing grooves 221 act to compress the air. As previously discussed, air can be compressed in the process. Upon entering the combustion chamber 250 from the bushing grooves 221, air can be mixed with fuel injected into the combustion chamber 250 from the fuel injectors 205. The air/fuel mixture can then be ignited by the ignition device 203. The combustion energy caused by ignition can be directed to the helical grooves 241 of the shaft 218 by the combustion section bushing 223. The exhaust gases entering the turbine section 216 can spin the shaft 218 while the exhaust gases then exit out the exhaust ports 243. Ignition timing can vary depending on the specific implementation of the third embodiment compressor 200.

An Exemplary Embodiment of a System for Generating Torque on a Shaft

Figure 11:
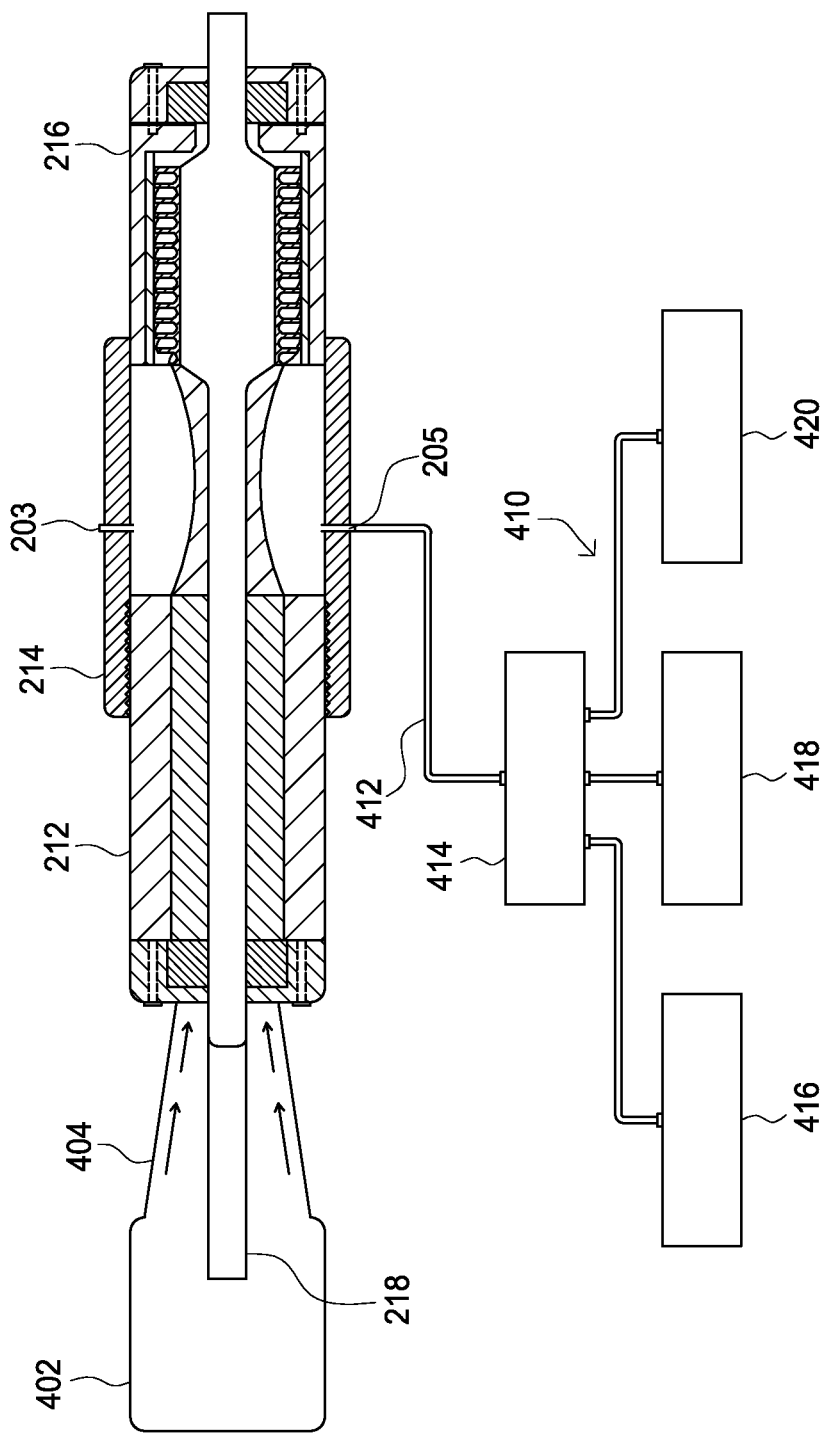
FIG. 11 is a side cut-away and plan view of a system for generating torque on a shaft according to an embodiment of the present invention.

Now referring to FIG. 11, an exemplary embodiment of a system 400 for generating torque on a shaft is shown. A third embodiment screw shaft turbine compressor 200 may be used in the system 400. As previously described, the third embodiment compressor 200 includes a compressor section 212, a combustion section 214, a turbine section 216, and a shaft 218. The shaft 218 may be considered part of the system 400 and generally extend though the third embodiment compressor 200 and be rotatably coupled to an air compressor 402, the compressor section 212, and the turbine section 216. It is to be appreciated that all contemplated embodiments and variations of the screw shaft turbine compressor described above can be used in the system 400.

The air compressor 402 can be included to generate an air flow for the third embodiment compressor 200. Generally, an outlet 404 of the air compressor 402 can be fluidly connected to the inlet ports 204 of the third embodiment compressor 200. As such, fluids exiting the outlet 404 of the air compressor 402 can be directed towards the inlet ports 204 of the third embodiment compressor 200.

In one embodiment, the air compressor 402 can be an independent compressor adapted to generate an air flow for the third embodiment compressor 200. For instance, a compressor bought from a store can be adapted to be fluidly coupled to the third embodiment compressor 200. In another embodiment, the air compressor 402 can be built as part of the system 400. As such, the air compressor 402 can be specifically adapted to be fluidly coupled to the third embodiment compressor 200.

Generally, the air compressor 402 can be operatively coupled to the shaft 218 proximal the proximal end 217 of the compressor section 212. The shaft 218 can generally extend from the air compressor 402 through the compressor section 212, the combustion section 214, and then through the turbine section 216 where the shaft 218 can operatively couple to a source or device adapted to receive torque including, but not limited to, a generator or other industrial applications.

The system 400 can further include a fuel injection system 410 operatively coupled to the fuel injectors 205 of the third embodiment compressor 200. The fuel injection system 410 can be operatively coupled to the fuel injectors 205 whereby a conduit 412 supplies fuel to the fuel injectors 205.

The fuel injection system 410 generally includes one or more fuel sources which combine in or proximal a manifold 414. For example, the one or more fuel sources can comprise a source 416 for propane, a source 418 for various hydrocarbons, and a source 420 for alcohols. In one embodiment, the fuel injection system can comprise a bin for wood and/or coal, a hopper, and a crusher, similar to the previously disclosed system. It is to be appreciated that the fuel injector 205 can be adapted to inject the crushed wood and/or coal.

Alternative Embodiments and Variations

The various embodiments and variations thereof, illustrated in the accompanying figures and/or described above, are merely exemplary and are not meant to limit the scope of the invention. It is to be appreciated that numerous other variations of the invention have been contemplated, as would be obvious to one of ordinary skill in the art, given the benefit of this disclosure.

All variations of the invention disclosed in this application are intended and contemplated to be within the spirit and scope of the invention.

I claim:

1. A device comprising:
   a compressor section including a compressor section bore and one or more inlet ports;
   a combustion section operatively coupled to the compressor section;
   a turbine section operatively coupled to the combustion section, the turbine section including a turbine section bore and one or more exhaust ports; and
   a shaft rotatably coupled to the compressor section and the turbine section, the shaft having at least one helical groove disposed thereon;
      wherein the shaft includes at least one tapered channel disposed on the shaft along at least a portion of the compressor section and at least a portion of the combustion section;
      wherein the shaft extends from at least a portion of the compressor section, through the combustion section, and to at least a portion of the turbine section.

2. The device of claim 1, wherein the compressor section further includes a bushing substantially surrounding the compressor section bore.

3. The device of claim 2, wherein the bushing includes one or more grooves disposed thereon.

4. The device of claim 1, wherein a longitudinal axis of each of the one or more inlet ports are parallelly aligned with a longitudinal axis of the compressor section.

5. The device of claim 1, wherein the combustion section further includes a bushing having a generally concave cylindrical shape.

6. The device of claim 1, wherein the shaft widens proximate a proximal end of the combustion section.

7. The device of claim 6, wherein the widened shaft includes one or more grooves.

8. The device of claim 7, wherein the one or more grooves of the widened shaft include one or more helically-shaped grooves disposed on the widened shaft.

9. The device of claim 1, wherein a longitudinal axis of each of the one or more exhaust ports are parallelly aligned with a longitudinal axis of the turbine section.

10. The device of claim 1, wherein the compressor section includes a support mechanism disposed within the compressor section.

11. The device of claim 10, wherein the support mechanism includes bearings.

12. The device of claim 1, wherein the turbine section includes a support mechanism disposed within the turbine section.

13. The device of claim 12, wherein the support mechanism includes bearings.

14. The device of claim 1, wherein the combustion section is (i) movably coupled to the compressor section and (ii) fixably coupled to the turbine section.

15. The device of claim 1, wherein the combustion chamber includes at least one ignition device.

16. A system for generating torque on a shaft, the system comprising:
- a shaft having one or more helical grooves disposed thereon;
- a device operatively coupled to the shaft, the device comprising:
  - a compressor section including a compressor section bore and one or more inlet ports;
  - a combustion section operatively coupled to the compressor section, the combustion section including a combustion chamber, at least one fuel injector, and at least one ignition device; and
  - a turbine section operatively coupled to the combustion section, the turbine section including a turbine section bore and one or more exhaust ports;
- an air compressor operatively coupled to the shaft; and
- a fuel injection system having one or more fuel sources, the fuel injection system operatively coupled to the fuel injector;
  - wherein the shaft (i) is rotatably coupled to the compressor section and the turbine section, and (ii) extends from the air compressor, through the compressor section, through the combustion section, and through the turbine section;
  - wherein the shaft includes at least one tapered channel disposed on the shaft along at least a portion of the compressor section and at least a portion of the combustion section.

17. The system of claim 16, wherein the compressor section further includes a bushing having one or more grooves disposed thereon, the bushing substantially surrounding the compressor section bore.

18. The system of claim 17, wherein the one or more grooves are tapered.

19. The system of claim 16, wherein the combustion section further includes a bushing having a generally concave cylindrical shape.

\* \* \* \* \*